United States Patent [19]

Kerdoncuff et al.

[11] Patent Number: 4,599,700
[45] Date of Patent: Jul. 8, 1986

[54] PROCESS AND DEVICE FOR DIGITAL FREQUENCY GENERATION

[75] Inventors: Guy P. Kerdoncuff, Perros Guirec; Jacques H. Provendier, Lannion, both of France

[73] Assignee: Societe Anonyme de Telecommunications, Paris, France

[21] Appl. No.: 731,597

[22] Filed: May 6, 1985

Related U.S. Application Data

[63] Continuation of Ser. No. 410,079, Aug. 20, 1982, abandoned.

[30] Foreign Application Priority Data

Aug. 28, 1981 [FR] France ................. 81 16441

[51] Int. Cl.$^4$ ............................................. G06F 1/02
[52] U.S. Cl. ..................................................... 364/721
[58] Field of Search ................. 364/718, 721; 328/14, 328/59

[56] References Cited

U.S. PATENT DOCUMENTS

| | | | |
|---|---|---|---|
| 3,735,269 | 5/1973 | Jackson | 328/14 |
| 3,772,681 | 11/1973 | Skingle | 328/14 |
| 3,898,446 | 8/1975 | Vatz | 364/721 |
| 4,114,189 | 9/1978 | Davis | 364/721 |
| 4,482,974 | 11/1984 | Kovalick | 364/721 |

OTHER PUBLICATIONS

Kinsel et al, "A Digital Signal Generator", *IEEE Micro*, vol. #1, No. 4, pp. 6-15, Nov. 1981.

*Primary Examiner*—James D. Thomas
*Assistant Examiner*—Dale M. Shaw
*Attorney, Agent, or Firm*—Holman & Stern

[57] ABSTRACT

The present invention relates to frequency generation of digital type, said frequencies being able to take values included in the 0.4000 Hz band. The invention consists in using the periodicity of the sine function on (0,2 $\pi$), in making samples correspond to each frequency f, each sample being represented by a triplet P, Q, S, P representing the rank, Q being a function of the quadrant to which said sample belongs on (0,2 $\pi$) S the sign, in memorizing 1/4T samples of the sine wave of frequency 1 Hz on (0,$\pi$/2), T being the sampling period, and in causing to correspond to any sample $Y_N$ indicative of the frequency f ($Y_N$=sin 2$\pi$P T) a sample of triplet (P, Q, S) of rank Nf chosen from the 1/4T samples, said correspondence being biunivocal. The invention is applicable to the generation of tones, to inter-exchange signalling in particular.

2 Claims, 3 Drawing Figures

PROCESS AND DEVICE FOR DIGITAL FREQUENCY GENERATION

This is a continuation of application Ser. No. 410,079, filed Aug. 20, 1982 which in turn is: abandoned.

BACKGROUND OF THE INVENTION

The present invention relates to the generation of frequencies of digital type, particulary for the generation of tones, inter-exchange signalling, equipment testing.

Such frequencies are used in particular for the emission of multi-frequency signals, tones, etc.

Tones result from frequencies by timing, whereas multi-frequency signals, for example those in accordance with the "MF SOCOTEL, $R_2$or keyboard" codes, result from the combination of various frequencies.

The signal to be generated is a signal of the general form $E = \sin 2\pi \, ft$.

In the PCM (pulse code modulation) systems, any signal characterised by a frequency f is indicated by a sequence of samples $x_n$. Each sample $x_p$ is written: $x_p = \sin 2\pi \, f_p T = \sin 2 \, Nt$ where p is the rank of the sample and T, equal to 1/F, the sampling period. 1/T = 8000 Hz is preferably selected in the PCM systems, which limits f to 4000 Hz, according to Shannon's theorem.

A multi-frequency signal generator device has already been described in the Journal Commutation et Electronique No. 59, October 1977, pages 99 to 115. This generator aims at using the periodicity of the sine function on the interval $(0, 2\pi)$, considering, on this interval, M values $\sin \alpha$, with $\alpha = (2\pi i)/M$. These M values are numbered and inscribed in a table, or read-only memory. This makes it possible to memorize only $M' = M/4$ values corresponding to the interval $(0, \pi/2)$. If the samples of the memory are read at frequency F, a sequence of samples indicative of a sinusoid of frequency F/M is obtained.

Read-out of the same memory, but retaining only one value every k values, k being a real number between 0 and M/2, furnishes a sequence of samples representative of a sinusoid of frequency $f = kf/M$.

However, when k is a mixed number, only the whole part of the number is taken into account for readout.

In other words, one does not therefore always read what one was supposed to read, so that an error in read-out, or a distortion, is introduced. Such a process of read-out causes a poor definition in the sequence of samples having to represent the desired frequency.

It is an object of the present invention to overcoe this drawback.

SUMMARY OF THE INVENTION

Due to the invention, it is therefore sufficient to inscribe in the table the values of a sine function of frequency equal to 1 Hz. In addition, the sampling frequency F being a constant of the process of the invention, sampling of the signal at whole frequency to be generated is effected biunivocally from the only samples in the table, therefore without distorsion, all that remains being the inevitable noise of quantification inherent in sampling.

In a preferred embodiment of the process of the invention, n values of the function $\sin 2\pi \, t$, such that $n = F/4$, are inscribed in the table.

Thus, F/4, or 2000, samples will be inscribed in the table.

BRIEF DESCRIPTION OF THE DRAWINGS

The invention will be more readily understood on reading the following description with reference to the accompanying drawings, in which.

DETAILED DESCRIPTION OF THE INVENTION

Figure 1:
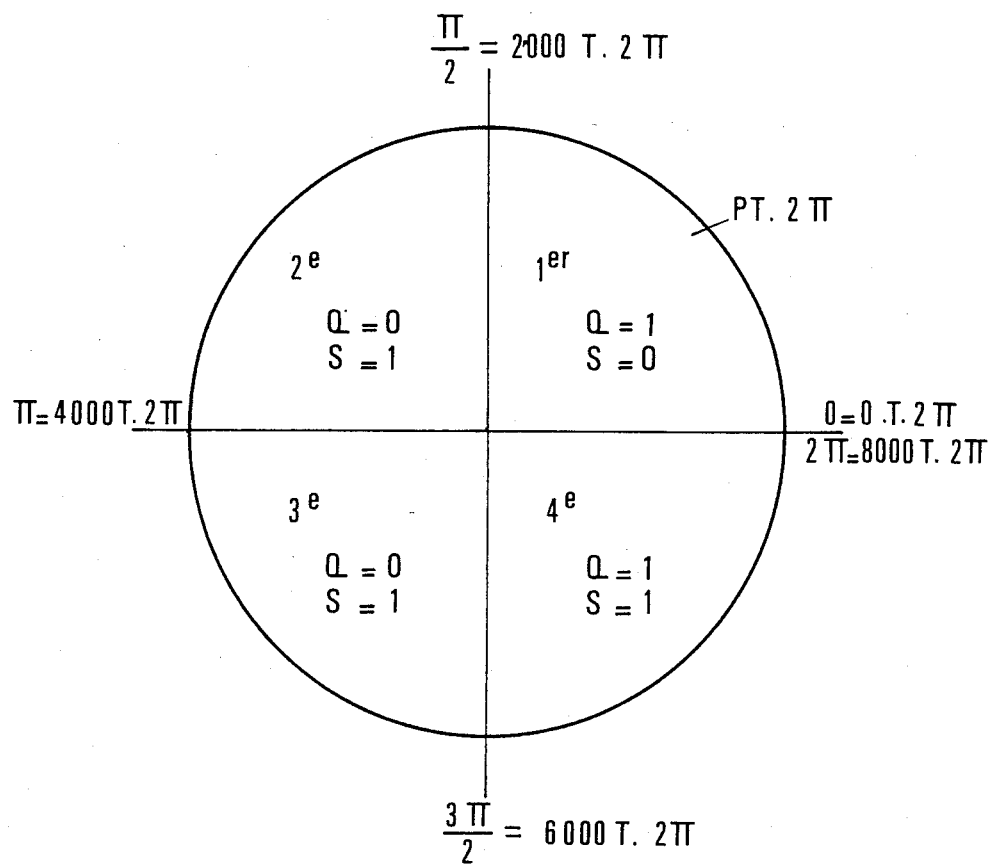
FIG. 1 is an illustration of the properties of the sine function, in the interval $(0, 2\pi)$.

Referring now to the drawings, FIG. 1 shows the trigonometric circle in whose four quadrants may be represented the properties of the sine function.

With each quadrant is associated a number K, such that $0 \leq K \leq 3$. The samples $Y_N$ associated with each of the quadrants are such that the sample of rank $N + 8000 \, q$ is identical to this sample $Y_N$.

$$Y(N+8000q) = Y_N$$

Another sample of rank P may easily be made to correspond to any sample of rank N.

If F is the sampling frequency, taken in the present case to be equal to 8000 Hz, T the sampling period, 8000 samples of rank NT, spaced in two's by $2\pi T$, correspond to the interval $(0 - 2\pi)$ of the trigonometric circle:

to 0 corresponds $0 \times T \times 2\pi$,
to $\pi/2$ corresponds $2000 \times T \times 2\pi$,
to $\pi$ corresponds $4000 \times T \times 2\pi$,
to $3\pi/2$ corresponds $6000 \times T \times 2\pi$,
to $2\pi$ corresponds $8000 \times T \times 2\pi$,
In the first quadrant $(0, \pi/2)$ we therefore have $$0 \leq N \leq 2000,$$

in the second quadrant $(\pi/2, \pi)$, we therefore have $$2000 \leq N \leq 4000,$$

in the third quadrant $(\pi, 3\pi/2)$ we therefore have $$4000 \leq N \leq 6000,$$

and in the fourth quadrant $(3\pi/2, 2\pi)$ we therefore have $$6000 \leq N \leq 8000.$$

In the first quadrant $(0, \pi/2)$, K is taken to be equal to 0, and we can put down $$\begin{aligned} Y_N &= \sin 2\pi \, NT \\ &= \sin 2\pi \, PT, \end{aligned}$$

therefore $P = N$, and $0 \leq P \leq 2000$

In the second quadrant $(\pi/2, \pi)$, $K = 1$, and we can put down $$\begin{aligned} Y_N &= \sin 2\pi \, NT \\ &= \sin(\pi - 2\pi \, NT) \\ &= \sin(4000 \, T 2\pi - 2\pi \, NT) \\ &= \sin 2\pi \, (4000 - N) \, T, \end{aligned}$$

therefore $P = 4000 - N$
As $2000 \leq N \leq 4000$, we have $0 \leq P \leq 2000.$ In the third quadrant $(\pi, 3\pi/2)$, $K=2$, and we can put down $$\begin{aligned}
Y_N &= \sin 2\pi NT \\
&= -\sin(2\pi NT - \pi) \\
&= -\sin(2\pi NT - 4000\ T\ 2\pi) \\
&= -\sin 2\pi(N - 4000)\ T \\
&= -\sin 2\pi PT
\end{aligned}$$

therefore $P = N - 4000$
As $4000 \leq N \leq 6000$ $$\begin{cases} 0 \leq P \leq 2000 \\ |Y_N| = \sin 2\pi PT \end{cases}$$

In the fourth quadrant $(3\pi/2, 2\pi)$, $K=3$ and we can put down $$\begin{aligned}
Y_N &= \sin 2\pi NT \\
Y_N &= \sin 2\pi NT \\
&= -\sin(2\pi - 2\pi NT) \\
&= -\sin(8000\ T\ 2\pi - 2\pi NT) \\
&= -\sin 2\pi(8000 - N)\ T \\
&= -\sin 2\pi PT
\end{aligned}$$

therefore $P = 8000 - N$
As $6000 \leq N \leq 8000$ $$\begin{cases} 0 \leq P \leq 2000 \\ |Y_N| = \sin 2\pi PT \end{cases}$$

Thus, any sample $Y_N$ may be characterized by the quadrant to which it belongs, said quadrant defined by a number K ($0 \leq K \leq 3$), by a number P enabling the absolute value of the sample to be determined, and by its sign, such that:

$|Y_N| = \sin 2\pi PT$ with $0 \leq P \leq 2000$.

Any frequency f included, in the present case, between 1 Hz and 4000 Hz, should therefore be coded by three parameters S, Q, P, where S represents the sign of the sample memorised, Q its parity and P the number defining its absolute value ssn $2\pi$ PT.

The parameters (P, Q, S) constitute the dynamic definition of the sample $Y_N$. To any new sample to be generated there corresponds another triplet (P', Q', S'). An algorithm for calculation enables the new triplet (P', Q', S') to be defined from the frequency f to be generated and from the preceding state (P, Q, S) as will be explained hereinbelow.

With the sample of rank n of the signal to be generated $E = A_m \sin 2\pi f t$, may be associated the sample $Y_N$ defined by the triplet (P, Q, S) such that $E_n = A_m Y_N$, where $A_m$ is the appropriately selected maximum amplitude which may be exploited by the system:

$|E_n| = A_m \sin 2\pi PT$

Figure 2:
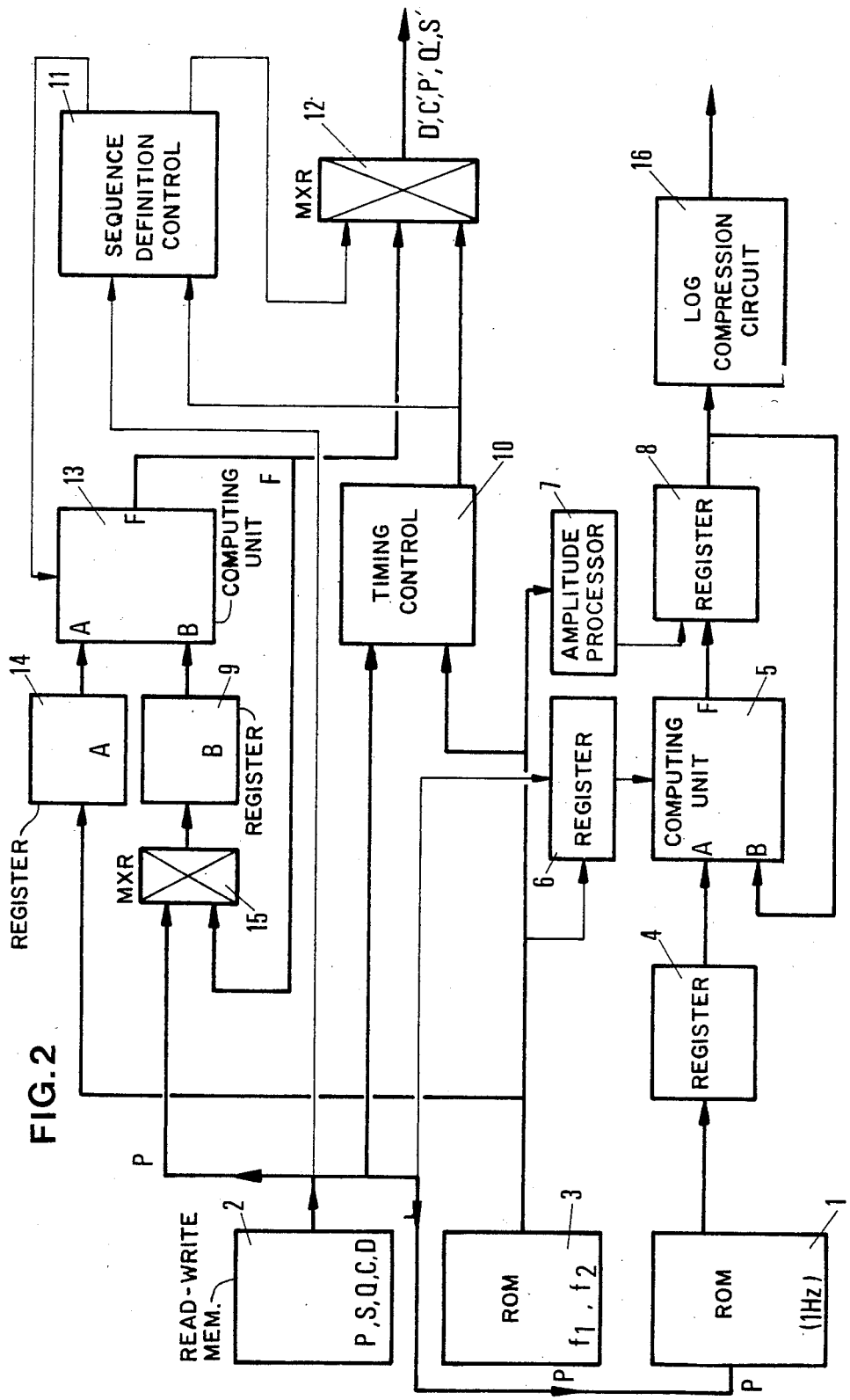
FIG. 2 shows the block diagram of the generating device according to the invention.

FIG. 2 shows the preferred embodiment of the tone generator carrying out the process of the invention.

The samples of frequency 1 Hz are stored in a memory 1 of capacity 1/4T. 2000 samples are in this case memorized since the sampling frequency is equal to 8 kHz.

In practice, 2048 words will advantageously be selected as memory capacity, this simplifying the algorithm for calculating the new triplet (P', Q', S').

The process of frequency generation according to the invention enables tones in particular to be produced. It is well known that a tone TON is expressed as a function of time as a sum of signals of frequencies $f_1$ and $f_2$ $TON = \{A_1 \sin 2\pi f_1 t + A_2 \sin 2\pi f_2 t\} \cdot h(t),$ where $A_1$ and $A_2$ are the respective amplitudes of the components of frequencies $f_1$ et $f_2$ and h(t) is a function of period $(t_1 + t_2)$ such that
 $h(t) = 1$ on interval 0, $t_1$,
 $h(t) = 0$ on interval $t_1$, $t_1 + t_2$
$t_2$ possibly being zero. This function h(t) corresponds to the timing of certain telephone tones.

In the same way as for a simple frequency, to each frequence $f_1$ or $f_2$ there corresponds a triplet of dynamic parameters $(P_1, Q_1, S_1)$ or $(P_2, Q_2, S_2)$ which are stored in a read-write memory 2.

The various parameters $A_1$, $A_2$, $f_1$, $f_2$, $t_1$, $t_2$ are stored in a read-only memory 3. Two new dynamic parameters D and C are thus associated with the signal in the case of a tone, D representing the emission state or the blocked state, and C representing the current value of a counter measuring the duration of emission ($t_1$) or of non-emission ($t_2$).

The device of FIG. 2 essentially comprises three memories, a read-only memory 1 for the samples of the sinusoid $\sin 2\pi t$, of frequency 1 Hz, a read/write memory 2 for parameters P, Q, S, C, D of each frequency forming the tone, and finally a read-only memory 3 for the characteristics $A_1$, $A_2$, $f_1$, $f_2$, $t_1$, $t_2$ of the same tone or of the frequency f to be generated. The memory 2 furnishes at the input of the memory 1 an address indicative of the rank P of the sample $Y_N$.

This sample $Y_N$ issuing from memory 1 is applied to register 4 which itself furnishes it to the input of a computer unit 5. A register 6 receives the sign S of samples as well as the characteristics of the tones enabling the type of operation (pure frequency or bifrequency code) to be effected to be defined. This result, applied to the input of the computing unit 5, defines the operation, addition or subtraction, effected by this unit 5. The data of memory 1, the samples of the sinusoid at 1 Hz, are addressed by the rank P of the samples furnished by the memory 2. This sample $Y_N$ issuing from memory 1 is applied to the input of the register 4 of the samples before being applied to the input of the computing unit 5. This sample RECH contained in the register 4 must in fact undergo a number of shifts and additions equivalent to a multiplication.

The dynamic parameter P issuing from memory 2 is also applied to the input of a register 9 memorizing the rank P of the preceding sample. The parameter Q is applied to the input of a device 11 for definition of the sequence of operations. It is this parameter Q which triggers off running of the algorithm, which will be explained in detail hereinbelow; the device 11 furnishes at the output an indication of operation intended for a computing unit 13.

A timing device 10 also receives at its input the width characteristic of the non-ringing period or of the ringing period, corresponding to frequency f or to frequencies $f_1$, $f_2$ of the tone concerned, issuing from the read-only memory 3. At the output of the timing device 10, the non-ringing or ringing characteristic is applied, on the one hand, to the input of a multiplexer 12, on the other hand to the input of the device 11 for definition of the sequence of operations.

The output of the multiplexer 12 corresponds to the input of the read/write memory 2 where the dynamic states P, Q, S, C, D of the signals to be produced are logged.

As has already been mentioned, any sample is generated from the preceding state. The algorithm for computing makes it possible to define the new parameters P', Q', S', C', D' from the former ones P, Q, S, C, D. This algorithm is effected by means of various registers.

The rank of the preceding sample introduced into register 9 is applied to the input of a computing unit 13 which effects the operation defined by the device 11. The unit 13 also receives the characteristic of frequency issuing from the read-only memory 3 after memorization in a register 14. At the output, the computing unit 13 furnishes an intermediate result which is applied to the input of a multiplexer 15 which multiplexes this result with the rank P of the preceding sample issuing from the memory 2. The register 9 thus does not exactly memorise the rank P of the preceding sample issuing from memory 2, but the result of the multiplexer issuing from multiplexer 15, such multiplexing connected with the running of the algorithm for computing.

The result elaborated by the computing unit 13 which is the rank P' of the new sample is also applied to the input of the multiplexer 12.

The parameters Q' and S', respectively of quadrants and of signs of samples, are furnished at the output of the device 11 for definition of the sequence of operations.

In this way, the multiplexer 12 receives the new parameter P' issuing from unit 13, the parameters Q' and S' issuing from the device 11 as well as the parameters C' and D' issuing from the device 10. All these new parameters are applied to the input of the read/write memory 2. At the output of the memory 2, the sign S is also applied to the input of the register 6 for defining the operations.

A device 7 for processing the amplitudes receives at the input the characteristics of frequency issuing from the memory 3 and corrects the result stored in a register 8 containing the result of computing furnished by the computing unit 5. The intermediate results furnished by this register 8 are reintroduced at the input of the computing unit 5 up to the end of the operations defined by the device 6, consequently effecting multiplications, by a series of shifts and additions.

The final result further undergoes a linear compression by logarithm by means of a device 16, before being emitted at the output in PCM code in accordance with the specifications inherent in this code.

Figure 3:
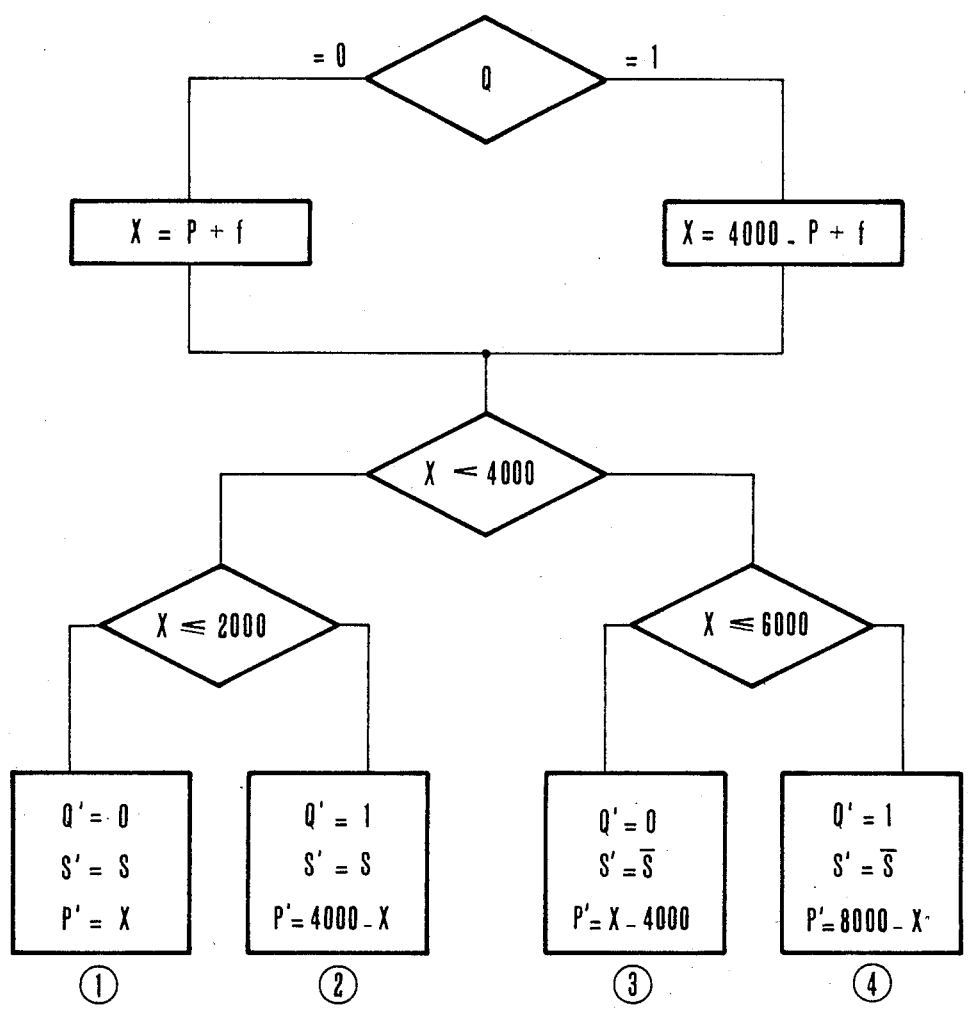
FIG. 3 shows the flow chart for calculating the triplet (P', Q', S') from triplet (P, Q, S).

Referring now to FIG. 3, the calculation for deducing any sample $Y_{N'}$, knowing the preceding sample $Y_N$ represented by the couple (K, P), K being the quadrant and P the rank, is illustrated by a flow chart.

The new sample $Y_{N'}$ is defined by the couple (K', P'). With regard to the data of the table which follows, rank N' of the new sample is placed apart from the rank N of the preceeding sample by the amount f, according to the formula $N'=N+f$, since $N=nf$ and $N'=(h+1)f=hf+f=N+f$. We saw previously that $1 \leq f \leq 4000$. We shall study the 4 differentiated possibilities for the value of K associated with sample $Y_{N'}$.

Thus, when K=0, $Y_N$ is in the 1st quadrant, we have N=P therefore $N'=N+f=P+f$.

CASE a $$0 \leq P+f \leq 2000$$

$Y_{N'}$ is in the first quadrant, therefore
K'=0, P'=P+f
and sin 2 $\pi$ N'T = sin 2 $\pi$ P' T

CASE b $$2000 < P+f < 4000$$

$Y_{N'}$ is in the 2nd quadrant
N'=4000−P'=P+f therefore
K'=1, P'=4000−(P+f)
and sin 2 $\pi$ N' T = sin 2 $\pi$ P' T

CASE c $$4000 \leq P+f \leq 6000$$

$Y_{N'}$ is in the 3rd quadrant
N'=4000+P'=P+f therefore
K'=2, P'=(P+f)−4000
and sin 2 $\pi$ N' T = −sin 2 $\pi$ P' T when K=1, $Y_N$ is in the 2nd quadrant. We have
N=4000−P
N'=N+f=4000−P+f

CASE a $$2000 < 4000−P+f < 4000$$

$Y_{N'}$ is in the 2nd quadrant
N'=4000−P'=4000−P+f therefore
(K'=1, P'=P−f
(sin 2 $\pi$ N't = sin 2 $\pi$ P' T

CASE b $$4000 \leq 4000−P+f \leq 6000$$

$Y_{N'}$ is in the 3rd quadrant
N'=4000+P'=4000−P+f therefore
(K'=2, P'=f−P
(sin 2 $\pi$ N' T = −sin 2 $\pi$ P' T

CASE c $$6000 < 4000−P+f < 8000$$

$Y_{N'}$ is in the 4th quadrant
N'=8000−P'=4000−P+f therefore
(K'=3, P'=4000+P−f
(sin 2 $\pi$ N' T = −sin 2 $\pi$ P' T Then, where K=2, $Y_N$ is in the 3rd quadrant, we have:
N=4000+P
N'=N+f=4000+P+f

CASE a $$4000 \leq 4000+P+f \leq 6000$$

$Y_{N'}$ is in the 3rd quadrant
N'=4000+P'=4000 P+f therefore
(K'=2, P'=P+f
(sin 2 $\pi$ N' T = −sin 2 $\pi$ P' T CASE b $6000 < 4000 + P + f < 8000$ $Y_N$ is in the 4th quadrant
$N' = 8000 - P' = 4000 + P + f$
therefore
$(K' = 3, P' = 4000 - (P + f)$
$(\sin 2\pi N'T = -\sin 2\pi P'T$ CASE c $8000 \leq 4000 + P + f \leq 2000 + 8000$ $Y_N$ is in the 1st quadrant
$N' = P' + k\, 8000$ with $k = 1$
$N' = P' + 8000 = 4000 + P + f$ therefore
$(K' = 0, P' = P + f - 4000$
$(\sin 2\pi N'T = \sin 2\pi P'T$ For $K + 3$, $Y_N$ is in the 4th quadrant, we have:
$N = 8000 - P$
$N' = N + f = 8000 - P + f$ CASE a $6000 < 8000 - P + f < 8000$ $Y_N$ is in the 4th quadrant
$N' = 8000 - P' = 8000 - P + f$ therefore
$(K' = 3, P' = P - f$
$(\sin 2\pi N'T = -\sin 2\pi P'T$ CASE b $8000 \leq 8000 - P + f \leq 2000 + 8000$ $Y_N$ is in the first quadrant
$N' = P' + 8000$ with $k = 1$
$N' = P' + 8000 = 8000 - P + f$ therefore
$(K' = 0, P' = f - P$
$(\sin 2\pi N'T = \sin 2\pi P'T$ CASE c $2000 + 8000 < 8000 - P + f < 4000 = 8000$ $Y_N$ is in the 2nd quadrant
$N' = 4000 - P' + 8000$ with $k = 1$
$N' = 4000 - P' + 8000 = 8000 - P + f$ therefore
$(K' = 1, P' = 4000 + P - f$
$(\sin 2\pi N'T = \sin 2\pi P'T$ We can deduce from the cases set forth hereinabove that, for $K = 0$ and $K = 2$ the passage from couple $(K, P)$ to couple $(K', P')$ follows the same law, viz.
case a: $K' = K$, $P' = P + f$
case b: $K' = K + 1$, $P' = 4000 - (P + f)$
case c: $K' = K + 2$, $P' = (P + f) - 4000$
for $K = 1$ and $K = 3$ the passage from couple $(K, P)$ to couple $(K', P')$ follows the same law, viz.
case a: $K' = K$, $P' = P - f$
case b: $K' = K + 1$, $P' = f - P$
czse c: $K' = K + 2$, $P' = 4000 + P - f$
for $K' = 0$ and $K' = 1$
Sample $Y_N$ is positive
for $K' - 2$ and $K' = 3$
Sample $Y_N$ is negative.

These observations lead us to code K in the following manner:

| K | S | Q |
|---|---|---|
| 0 | 0 | 0 |
| 1 | 0 | 1 |
| 2 | 1 | 0 |

-continued

| K | S | Q |
|---|---|---|
| 3 | 1 | 1 |

S represents the sign of the sample associated with the couple (K, P), namely
S = 0 for a positive sample, S = 1 for a negative sample,
Q, binary element of parity of K, defines the operations giving the couple (K', P').

FIG. 3 summarises the flow chart for deducing each triplet (P', Q', S') from the preceding triplet (P, Q, S).

The relation between the flow chart of FIG. 3 and the above cases is established in the following Table.

①:
K even (0,2), case a
②:
K even, case b
K odd (1,3), case a
③:
K even, case c
K odd, case b
④:
K odd, case c

What is claimed is:

1. In a digital frequency generator for selectively generating continuous or discontinuous mono-frequency or bi-frequency signals having at least one component E represented by the expression $E = \sin 2\pi ft$, where t represents time and f represents frequency, said component taking the form of a series of samples $x_p$ represented by $x_p = \sin 2\pi f_p T$ of rank p, p, being an integer having a value in the range 1 to p, a device for providing said series of samples $x_p$ comprising:

read only memory means for storing n samples $x_p$, said n samples corresponding to n different values of the function $\sin 2\pi t$ at successive instants of time $t_1 = 1/F$, $t_2 = 2/F$, ... $t_n = n/F$, where F is the sampling frequency at which said n different values are obtained;

read/write memory means for storing parameters of each of said samples in the form of a triplet P, Q, S where P is the absolute value $\sin 2\pi PT$ of the sample of rank p and Q and S define a quadrant of a trigonometric circle containing the sample;

addressing means responsive to the rank P of the sample furnished by said read/write memory means for addressing the samples stored in said read only memory means and "biunivocally" providing an addressed sample $Y_N$ of rank p of the signal to be generated from the sample of rank pf of the function $\sin 2\pi t$ contained in the read only memory, wherein "biunivocally" means that one and only one sample of rank p of the signal to be generated corresponds to each sample of pf contained in the read only memory, and one and only one sample of the rank pf contained in the read only memory corresponds to each sample of rank p of the signal to be generated; and computing means responsive to the addressed sample $Y_N$ provided by said read only memory means and to the triplet parameters P, Q, S of the addressed sample stored in said read/write memory means and indicative of the sample of instant pT, and without any operator intervention, for providing the further triplet P′, Q′, S′ representative of the sample $x_{(p+1)}$ for the instant of time $(p+1)T$.

2. In a digital frequency generator, the method of selectively generating a continuous or discontinuous mono-frequency or bi-frequency signal having at least one component E represented by the expression $E = \sin 2\pi ft$, wherein t represents time and f represents frequency, said component taking the form of a series of samples $x_p$ represented by $x_p = \sin 2\pi pT$ of rank p, p being an integer having a value in the range of 1 to p, a method for providing said series of samples comprising the steps of:

storing in a read only memory n samples $x_p$, said n samples corresponding to n different values of the function $\sin 2\pi t$ at successive instants of time $t_1 = 1/F$, $t_2 = 2/F \ldots t_n = n/F$, where F is the sampling frequency at which said n different values are obtained;

storing in a read/write memory parameters of each of said samples in the form of a triplet P, Q, S where P is the absolute value of $\sin 2\pi PT$ of the sample of rank p, and Q and S define a quadrant of a trigonometric circle containing the sample;

addressing the samples stored in said read only memory with the rank P of the sample furnished by said read/write memory and "biunivocally" providing an addressed sample $Y_N$ of rank p of the signal to be generated from the sample of rank pf of the function $\sin 2\pi t$ contained in the read only memory, wherein "biunivocally" means that one and only one sample of rank p of the signal to be generated corresponds to each sample of rank pf contained in the read only memory, and one and only one sample of rank pf contained in the read only memory corresponds to each sample of rank p of the signal to be generated; and without operator intervention, and in response to the addressed sample $Y_N$ provided by said read only memory and to the triplet parameters P,Q,S of the addressed sample stored in said read/write memory and indicative of the sample of the instant pT, providing the further triplet P′, Q′, S′ representative of the sample $x_{(p+1)}$ for the instant of time $(p+1)T$.

* * * * *